(12) United States Patent
Bregman et al.

(10) Patent No.: US 11,726,854 B2
(45) Date of Patent: Aug. 15, 2023

(54) HOST MALFUNCTION DETECTION FOR CI/CD SYSTEMS

(71) Applicant: Red Hat, Inc., Raleigh, NC (US)

(72) Inventors: Arie Bregman, Ra'anana (IL); Avraham Talmor, Ra'anana (IL); Ilan Gersht, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/443,625

(22) Filed: Jul. 27, 2021

(65) Prior Publication Data
US 2023/0035437 A1  Feb. 2, 2023

(51) Int. Cl.
*G06F 11/30*  (2006.01)
*G06F 11/07*  (2006.01)
*G06F 11/34*  (2006.01)

(52) U.S. Cl.
CPC ........ *G06F 11/0772* (2013.01); *G06F 11/076* (2013.01); *G06F 11/3006* (2013.01); *G06F 11/3082* (2013.01); *G06F 11/3409* (2013.01)

(58) Field of Classification Search
CPC .......................... G06F 11/3409; G06F 11/0751
See application file for complete search history.

(56) References Cited

U.S. PATENT DOCUMENTS

| | | | |
|---|---|---|---|
| 8,949,658 B1* | 2/2015 | Scanlan | G06F 11/0793 714/4.2 |
| 10,528,458 B2 | 1/2020 | Brafman et al. | |
| 10,635,566 B1* | 4/2020 | Talluri | G06F 9/4488 |
| 10,901,876 B2 | 1/2021 | Herrin et al. | |
| 10,963,242 B2 | 3/2021 | Thomas, Jr. et al. | |
| 10,979,440 B1 | 4/2021 | Kalika | |
| 11,340,939 B1* | 5/2022 | Barker, Jr. | G06F 3/067 |
| 2010/0191851 A1 | 7/2010 | Raja et al. | |
| 2011/0098973 A1 | 4/2011 | Seidman | |
| 2017/0255460 A1* | 9/2017 | Frank | G06F 9/45558 |
| 2017/0329698 A1* | 11/2017 | Watt | G06F 9/45558 |
| 2020/0073781 A1* | 3/2020 | Falko | G06F 11/3636 |
| 2020/0089533 A1* | 3/2020 | Guha | G06F 11/3006 |
| 2020/0218623 A1 | 7/2020 | Zhang et al. | |
| 2020/0387441 A1 | 12/2020 | Bregman | |
| 2021/0019193 A1* | 1/2021 | Ffrench | G06F 9/5061 |
| 2021/0304102 A1* | 9/2021 | Saraswat | G06F 11/3452 |

FOREIGN PATENT DOCUMENTS

CN  106991035 B  4/2020

OTHER PUBLICATIONS

Extended European Search Report Serial No. EP 21 19 8732, dated Feb. 28, 2022, 9 pages.

* cited by examiner

*Primary Examiner* — Yolanda L Wilson
(74) *Attorney, Agent, or Firm* — Lowenstein Sandler LLP

(57) ABSTRACT

A method includes for each node of a plurality of nodes, determining a runtime value associated with an execution of a continuous integration and continuous delivery/deployment (CI/CD) pipeline, determining, for each node of the plurality of nodes, an aggregate performance statistic in view of the runtime value of the plurality of nodes, identifying, in view of the aggregate performance statistic, at least one node of the plurality of nodes that satisfies a performance threshold criterion, and responsive to identifying the at least one node of the plurality of nodes that satisfied the performance threshold criterion, marking the at least one node of the plurality of nodes as underperforming.

18 Claims, 4 Drawing Sheets

300

For each node of a plurality of nodes, determine a failure count associated with an execution of a continuous integration and continuous delivery/deployment (CI/CD) pipeline. 310

Identify, among the plurality of nodes, a nodes in which the corresponding failure count exceeds an aggregate failure statistic reflecting the failure counts of the plurality of nodes. 320

Responsive to identifying the at least one node of the plurality of nodes in which the corresponding failure count exceeds the aggregate failure statistic, mark the node as experiencing a high rate of failure. 330

FIG. 3

HOST MALFUNCTION DETECTION FOR CI/CD SYSTEMS

TECHNICAL FIELD

The present disclosure is generally related to computer systems, and more particularly, to host malfunction detection for a continuous integration and continuous delivery/deployment (CI/CD) systems.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) and/or containers hosted on its computer hardware available to customers for this purpose. A container is a "lightweight" execution environment having relaxed isolation properties (as compared to VMs) for sharing an Operating System (OS) among applications. Similar to a VM, a container can have its own filesystem, share of processing, memory, process space, etc. A container for an application can be packaged, together with libraries and dependencies and decoupled from the underlying infrastructure, making the container portable (e.g., portable across clouds and OS distributions). The cloud provider can provide an interface that a user can use to requisition VMs and/or containers and associated resources such as security policies, processors, storage, and network services, etc., as well as an interface to install and execute the user's applications and files. PaaS system offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which:

FIG. 3 depicts a flow diagram of a method for converting a CI/CD pipeline into a container, in accordance with one or more aspects of the present disclosure.

DETAILED DESCRIPTION

Figure 1:
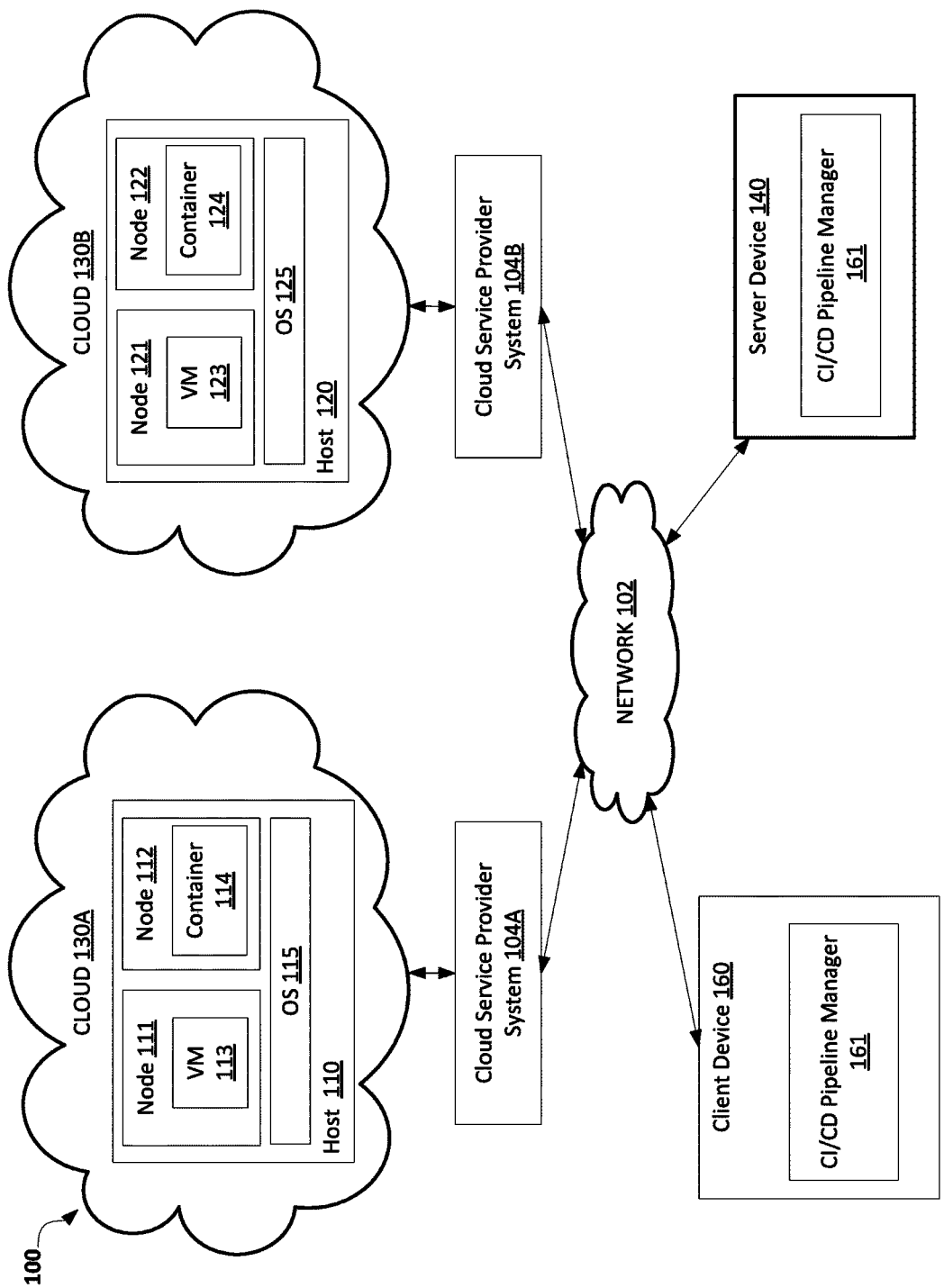
FIG. 1 depicts a high-level component diagram of an example computer system architecture, in accordance with one or more aspects of the present disclosure.

Described herein are methods and systems for implementing execution platform assignments in continuous integration and continuous delivery/deployment (CI/CD) systems.

CI/CD is a method to deliver applications to customers by introducing automation into the stages of software (e.g., application) development. CI/CD is a solution to the problems integrating new code can cause for development and operations teams. CI/CD introduces ongoing automation and continuous monitoring throughout the software lifecycle, from integration and testing phases to delivery and deployment phases. Taken together, this sequence of operations are often referred to as a "CI/CD pipeline" and are supported by development and operations ("DevOps") teams working together in an agile way with either a DevOps or Site Reliability Engineering (SRE) approach.

Continuous integration (CI) generally refers to an automation process for developers. Successful CI means new code changes can be regularly built, tested, and merged to a shared repository. CI provides a solution to the problem of having too many potentially conflicting branches of an application in development. The "CD" in CI/CD stands for continuous delivery and/or continuous deployment, which are related concepts that sometimes get used interchangeably. Both continuous delivery and continuous deployment generally refer to automating further stages of the CI/CD pipeline.

For example, continuous delivery generally means that a developer's software changes are automatically bug tested and uploaded to a repository, where they can then be deployed to a live production environment by the operations team. Continuous delivery provides a solution to the problem of poor visibility and communication between developer and business teams. To that end, the purpose of continuous delivery is to ensure that it takes minimal effort to deploy new code.

Continuous deployment can refer to automatically releasing a developer's changes from the repository to production, where it is usable by customers. Continuous deployment addresses the problem of overloading operations teams with manual processes that slow down delivery, and builds on the benefits of continuous delivery by automating the next pipeline stage ("stage") in the CI/CD pipeline. A stage includes a set of tasks or jobs where, if every task in a given stage succeeds, then the CI/CD pipeline can transition to the next stage. If a task in the given stage fails, then CI/CD pipeline can prematurely terminate or, in some cases, move to the next stage.

Examples of pipeline stages include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

When executed, a CI/CD pipeline implements a workflow to automatically perform the stages described above. The sequence of operations can include a sequence of commands, conditional and/or unconditional execution control transfers, etc. For example, when creating a CI/CD pipeline definition, a location of a test directory in a project can be identified, and then the CI/CD pipeline definition can be created automatically to execute one or more tests from the test directory.

A set of execution platforms, also referred to as a set of worker machines or hosts ("workers"), can be used to execute the tasks of a CI/CD pipeline as provided by the CI/CD pipeline definition. The set of execution platforms can include one or more execution platforms. For example, multiple tasks in a given stage can be executed in parallel based on the number of available execution platforms. An execution platform can have a corresponding platform type (e.g., virtual machine, container, or bare-metal) and set of resource specifications or parameters (e.g., processing, memory, and networking). The platform type and the set of resource specifications can collectively be referred to as a combination of attributes for executing a CI/CD pipeline.

In a typical scenario, the set of execution platforms can be selected from a pool of execution platforms for assignment or linking to the CI/CD pipeline. Assigning refers to designating the set of execution platforms to the CI/CD pipeline for execution (e.g., linking the set of execution platforms to the CI/CD pipeline). If no execution platforms are assigned to the CI/CD pipeline, one or more default execution platforms can be selected. The pool can be a homogeneous pool or a heterogeneous pool. A homogeneous pool, also referred to as a unified pool, is a pool in which each execution platform has the same combination of attributes for executing a CI/CD pipeline. For example, each execution platform has the same platform type (e.g., virtual machine, container, or bare-metal) and the same set of resource specifications. In contrast, a heterogeneous pool is a pool in which at least one execution platform has a different combination of attributes for executing a CI/CD pipeline.

Typically, as the set of execution platforms assigned to the CI/CD pipeline increases, it becomes increasingly important to implement monitoring systems to monitor the set of execution platforms. The monitoring system, typically, monitors various hardware and software aspects, such as, resource specifications or parameters (e.g., processing, memory, and networking) of an execution platform. However, issues can arise when various execution platforms of the monitored set of execution platforms either underperform or experience high rates of failure as compared to other executions platforms of the set of execution platforms which are missed by the monitoring system.

Aspects of the present disclosure address the above noted and other deficiencies by implementing a monitoring system that can identify execution platforms in a set of execution platforms assigned to a CI/CD pipeline that may be underperforming or experiencing an unusually high rate of failure when compared to other execution platforms in the set of execution platforms.

Advantages of the present disclosure include, but are not limited to, improving efficiency of a pool of execution platforms assigned to the CI/CD system by reducing failures of the CI/CD pipeline at the set of executions platforms.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

The client device 160 may include a CI/CD pipeline manager 161. The CI/CD pipeline manager 161 can assign a set of execution platforms to a CI/CD pipeline for execution. For example, the CI/CD pipeline manager 161 can receive a definition of a CI/CD pipeline, and obtain a characterization indicative of a use case of the CI/CD pipeline from the definition. The CI/CD pipeline manager 161 can identify, from a pool of execution platforms, a set of candidate execution platforms having a platform type corresponding to the characterization. For example, the set of candidate execution platforms can include one or more execution platforms that are currently available for assignment to the CI/CD pipeline. From the set of candidate execution platforms, the CI/CD pipeline manager 161 can select a subset of execution platforms having a combination of attributes for executing the CI/CD platform, and assign the subset of execution platforms to the CI/CD pipeline for execution. The CI/CD pipeline manager causes the assigned subset of execution platforms to execute the CI/CD pipeline.

The CI/CD pipeline manager 161 can further monitor the subset of execution platforms to avoid underperformance and/or failures at the subset of execution platforms based on performance of other execution platforms in the subset of execution platforms.

The CI/CD pipeline manager 161 can determine whether an execution platform of the subset of execution platforms is underperforming by determining whether an aggregate performance statistic of each execution platform of the subset of execution platforms (e.g., nodes) exceeds the performance threshold (i.e., whether the aggregate performance statistic of a respective execution platform satisfies a performance threshold criterion). As described previously, the execution platforms (e.g., nodes) is one of a container, a virtual machine, or a bare-metal host. The aggregate performance statistic represents a ratio of a difference between a runtime value of an execution platform of the subset of execution platforms and an average runtime value of the subset of execution platforms excluding the execution platform of the subset of execution platforms and the average runtime value of the subset of execution platforms excluding the execution platform of the subset of execution platforms. The runtime value of the CI/CD pipeline at the respective execution platform represents an elapsed time of executing the CI/CD pipeline (e.g., execution of all the stages of the CI/CD pipeline). The performance threshold refers to a predetermined aggregate performance statistic value (e.g., $2/10$ or 20%) at which an execution platform of the subset of execution platforms is considered underperforming with respect to other execution platforms of the subset of execution platforms. For example, a predetermined aggregate performance statistic value of $2/10$ or 20% indicates that the elapsed time of executing the CI/CD pipeline on the specific execution platform is taken 20% more time to run as compared to all the other execution platforms of the subset of execution platforms.

The CI/CD pipeline manager 161 can determine whether an execution platform of the subset of execution platforms is experiencing a high rate of failure by determining whether a number of failures experienced at the respective execution platform exceeds the failure threshold (i.e., whether the number of failures experienced at the respective execution platform satisfies a failure threshold criterion). The failure threshold refers to an aggregate failure statistic of the failure counts of the plurality of nodes. In an illustrative example, the aggregate failure statistic can reflect the mean of the failure counts of the plurality of nodes. In another illustrative example, the aggregate failure statistic can reflect the mean of the failure counts of the plurality of nodes excluding the failure count of the suspected outlier execution platform of the subset of execution platforms. In another illustrative example, the aggregate failure statistic can reflect the median of the failure counts of the plurality of nodes. In another illustrative example, the aggregate failure statistic can reflect the median of the failure counts of the plurality of nodes excluding the failure count of the suspected outlier execution platform of the subset of execution platforms.

To determine whether the number of failures experienced at the respective execution platform exceeds the failure threshold, the number of failures experienced at the respective execution platform due to the CI/CD pipeline is compared with the aggregate failure statistic at each of the other execution platform of the subset of execution platforms due to the CI/CD pipeline.

Depending on the embodiments, to determine whether the number of failures experienced at the respective execution platform exceeds the failure threshold, the number of failures experienced at the respective execution platform irrespective of the CI/CD pipeline is compared with the aggregate failure statistic at each of the other execution platform of the subset of execution platforms irrespective of the CI/CD pipeline. A failure of a CI/CD pipeline at an execution platform represent a CI/CD pipeline that was unable to successfully complete execution (e.g., complete execution of all the stages of the CI/CD pipeline).

If the CI/CD pipeline manager 161 determines that an execution platform of the subset of execution platforms is underperforming and/or experiencing high rates of failure, the CI/CD pipeline manager 161 can flag (e.g., mark) the execution platform of the subset of execution platforms (e.g., flagged as low priority, offline, temporary maintenance, or etc.). To flag the execution platform of the subset of execution platforms, the CI/CD pipeline manager 161 can maintain a data structure (e.g., a list) of the subset of execution platforms that are assigned to a particular CI/CD pipeline. The each execution platform of the list of the subset of execution platforms is associated to performance characteristics (e.g., aggregate performance statistic and/or aggregate failure statistic). Upon the flagging of the execution platform of the subset of execution platform due to either the aggregate performance statistic or the aggregate failure statistic, the CI/CD pipeline manager 161 can alert the user to the performance issues of the execution platform. Once the execution platform of the subset of execution platforms is flagged, the CI/CD pipeline manager 161 determines whether the underperforming and/or high rate of failure is due to the execution platform or the CI/CD pipeline. To determine whether the underperformance and/or high rate of failure, is due to the execution platform or the CI/CD pipeline, the CI/CD pipeline manager 161 utilizes CI/CD system tools, for example, ausearch, auaudit, Kdump, TCP dump, or any other suitable system tools implemented in the Linux operation system to analyze the marked execution platform. Upon determining that the reasons for the underperformance and/or high rate of failure is due to the execution platform, the CI/CD pipeline manager 161 can use a configuration management tool to configure the execution platform to resemble similar execution platforms of the subset of execution platforms that may have results from a configuration drift or changes in the execution platform. Upon determining that the reasons for the underperformance and/or high rate of failure is due to an external services (e.g., web search, third-party API call, third-party services) which can cause the CI/CD pipeline to failure, the flagged execution platform of the subset of execution platforms may be un-flagged. Further details regarding the functionality of the CI/CD pipeline manager 161 are described below with reference to FIGS. 2 and 3.

Figure 2:
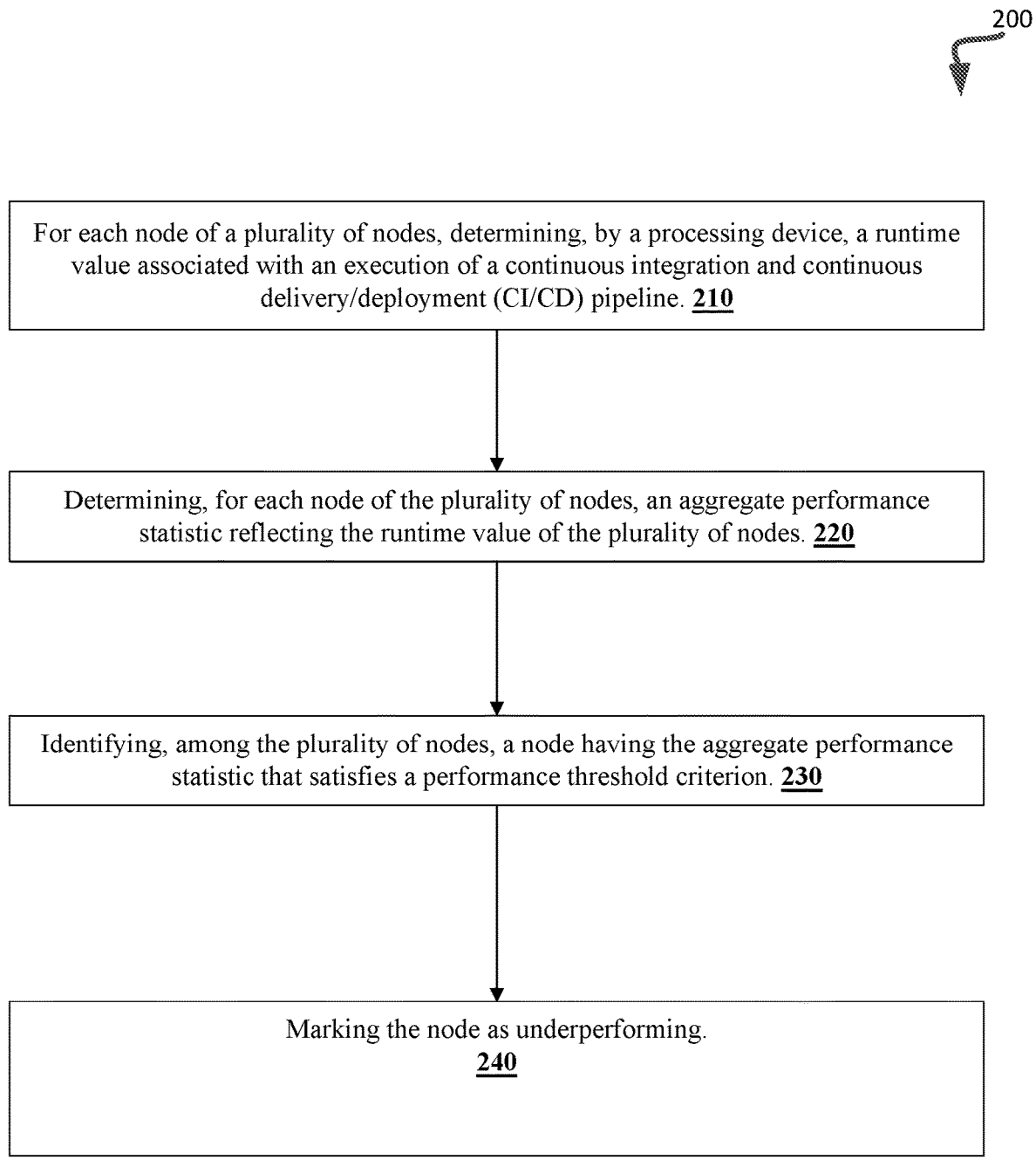
FIG. 2 depicts a flow diagram of a method for implementing CI/CD pipeline to container conversion, in accordance with one or more aspects of the present disclosure.

FIG. 2 depicts a flow diagram of an example method 200 for assigning a set of execution platforms to a CI/CD pipeline, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by a CI/CD manager, such as the CI/CD manager 161 in FIG. 1. Alternatively, some or all of method 200 might be performed by another module or machine. It should be noted that blocks depicted in FIG. 2 could be performed simultaneously or in a different order than that depicted.

At block 202, for each node of a plurality of nodes, the processing logic determines a runtime value associated with an execution of a continuous integration and continuous delivery/deployment (CI/CD) pipeline. As described previously, the runtime value represents an elapsed time of executing the CI/CD pipeline by a node. The nodes is one of a container, a virtual machine, or a bare-metal host.

At block 204, the processing logic determines, for each node of the plurality of nodes, an aggregate performance statistic reflecting the runtime values of the plurality of nodes.

At block 206, the processing logic identifies, among the plurality of nodes, a node having the aggregate performance statistic that satisfies a performance threshold criterion. As described previously, to identify among the plurality of nodes, the node having the aggregate performance statistic that satisfies the performance threshold criterion, the processing logic determines whether the aggregate performance statistic of the node of the plurality of nodes exceeds the performance threshold. The aggregate performance statistic represents a ratio of a difference between a runtime value of a node of the plurality of nodes and an average runtime value of the plurality of nodes excluding the node of the plurality of nodes and the average runtime value of the plurality of nodes excluding the node of the plurality of nodes. The performance threshold refers to a predetermined aggregate performance statistic value at which a node of the plurality of nodes is considered underperforming with respect to other nodes of the plurality of nodes.

At block 208, the processing logic marks the node as underperforming. Depending on the embodiment, the processing logic analyzes the at least one node of the plurality of nodes marked as underperformed to determine a cause of underperformance.

In some embodiments, for each node of a plurality of nodes, the processing logic determines a failure count associated with the execution of the CI/CD pipeline. Then the processing logic identifies, among the plurality of nodes, a node that satisfies a failure threshold criterion. Responsive to identifying the node of the plurality of nodes that satisfied the failure threshold criterion, the processing logic marks the node as experiencing a high rate of failure. To identify the at least one node of the plurality of nodes that satisfies the failure threshold criterion, the processing logic determines whether the failure count of a node of the plurality of nodes exceeds the failure threshold. As described previously, the failure threshold is in view of an aggregate failure statistic reflecting the failure counts of the plurality of nodes.

FIG. 3 depicts a flow diagram of an example method 300 for training a model for selecting a set of execution platforms for assignment to a CI/CD pipeline, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by a CI/CD manager, such as the CI/CD manager 161 in FIG. 1. Alternatively, some or all of method 300 might be performed by another module or machine. It should be noted that blocks depicted in FIG. 3 could be performed simultaneously or in a different order than that depicted.

At block 302, for each node of a plurality of nodes, the processing logic determines a failure count associated with an execution of a continuous integration and continuous delivery/deployment (CI/CD) pipeline, wherein the failure count represent a number of times the execution of the CI/CD pipeline failed.

At block 304, the processing logic identifies, among the plurality of nodes, a node in which the corresponding failure count exceeds an aggregate failure statistic reflecting the failure counts of the plurality of nodes.

At block 306, responsive to identifying the at least one node of the plurality of nodes in which the corresponding failure count exceeds the aggregate failure statistic, the processing logic marks the node as experiencing a high rate of failure.

Figure 4:
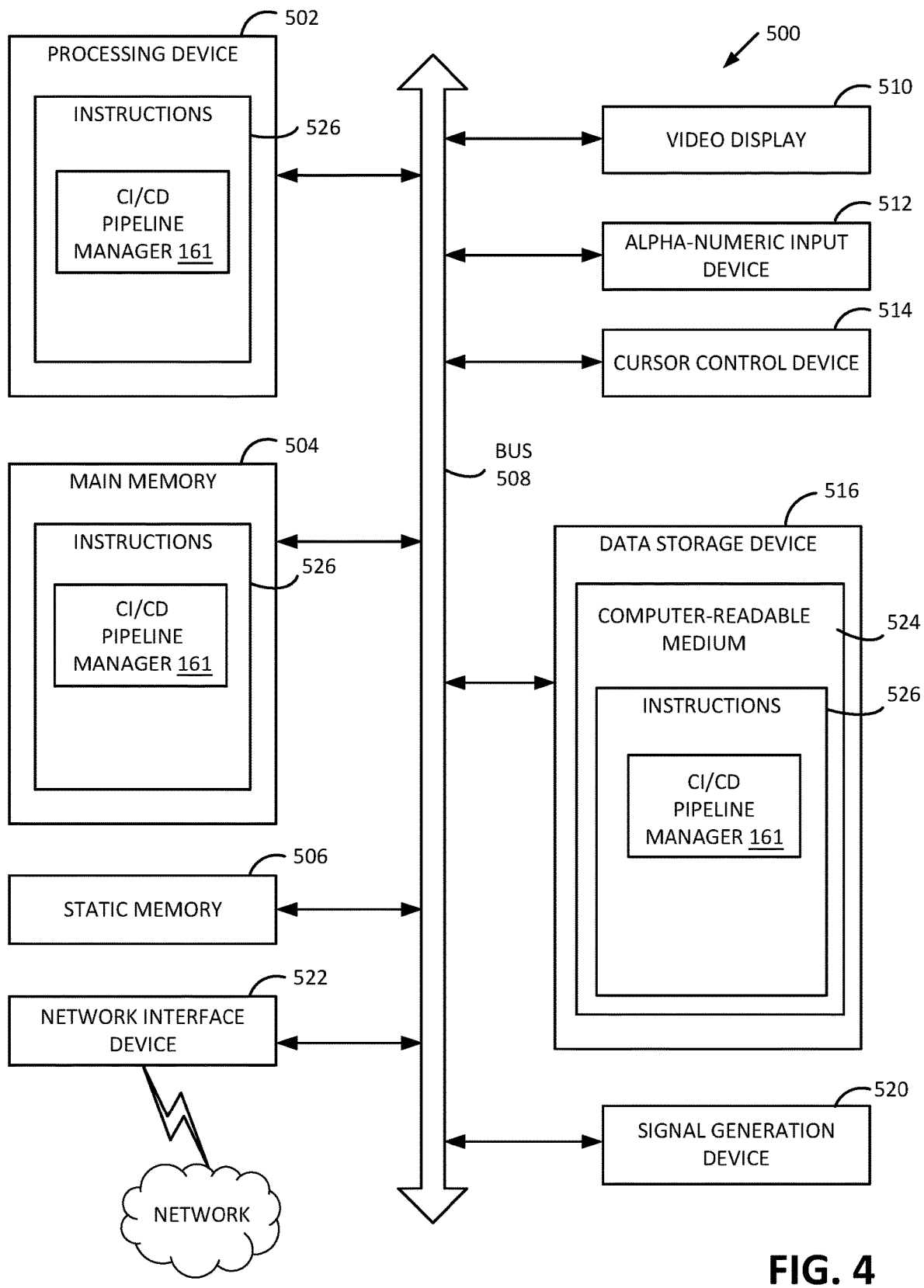
FIG. 4 depicts a block diagram of an illustrative computer system operating in accordance with one or more aspects of the present disclosure.

FIG. 4 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes CI/CD pipeline manager 161 for performing the operations and steps discussed herein (e.g., corresponding to the method of FIGS. 2 and 3, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include CI/CD pipeline manager 161 (e.g., corresponding to the method of FIGS. 2 and 3, etc.) embodying any one or more of the methodologies or functions described herein. CI/CD pipeline manager 161 may also reside, completely or at least partially, within the main memory 504 and/or within the processing device 502 during execution thereof by the computer system 500, the main memory 504 and the processing device 502 also constituting computer-readable media. CI/CD pipeline manager 161 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising: for each node of a plurality of nodes, determining, by a processing device executing instructions associated with a continuous integration and continuous delivery/deployment (CI/CD) pipeline manager, a runtime value associated with an execution of a CI/CD pipeline; determining, by the processing device executing instructions associated with a continuous integration and continuous delivery/deployment (CI/CD) pipeline manager, for each node of the plurality of nodes, an aggregate performance statistic reflecting the runtime values of the plurality of nodes, wherein the aggregate performance statistic represents a ratio of a difference between a runtime value of a node of the plurality of nodes and an average runtime value of the plurality of nodes excluding the node of the plurality of nodes and the average runtime value of the plurality of nodes excluding the node of the plurality of nodes; identifying, by the processing device executing instructions associated with a continuous integration and continuous delivery/deployment (CI/CD) pipeline manager, among the plurality of nodes, a node having the aggregate performance statistic that satisfies a performance threshold criterion; and marking, by the processing device executing instructions associated with a continuous integration and continuous delivery/deployment (CI/CD) pipeline manager, the node as underperforming.

2. The method of claim 1, wherein the runtime value represents an elapsed time of executing the CI/CD pipeline by the node.

3. The method of claim 1, wherein identifying the node of the plurality of nodes that satisfies the performance threshold criterion includes determining whether the aggregate performance statistic of the node of the plurality of nodes exceeds the performance threshold.

4. The method of claim 3, wherein the performance threshold refers to a predetermined aggregate performance statistic value at which a node of the plurality of nodes is considered underperforming with respect to other nodes of the plurality of nodes.

5. The method of claim 1, wherein the node comprises at least one of: a container, a virtual machine, or a bare-metal host.

6. The method of claim 1, further comprising:
analyzing the node to determine a cause of underperformance.

7. The method of claim 1, further comprising:
for each node of a plurality of nodes, determining a failure count associated with the execution of the CI/CD pipeline;
identifying, among the plurality of nodes, a node that satisfies a failure threshold criterion; and
responsive to identifying the node of the plurality of nodes that satisfied the failure threshold criterion, marking the node as experiencing a high rate of failure.

8. The method of claim 7, wherein identifying the node of the plurality of nodes that satisfies the failure threshold criterion includes determining whether the failure count of a node of the plurality of nodes exceeds the failure threshold, and wherein the failure threshold is in view of an aggregate failure statistic reflecting the failure counts of the plurality of nodes.

9. A system comprising: a memory; and a processing device, operatively coupled to the memory, to perform operations comprising: for each node of a plurality of nodes, determining, by the processing device executing instructions associated with a continuous integration and continuous delivery/deployment (CI/CD) pipeline manager, a runtime value associated with an execution of a CI/CD pipeline; determining, by the processing device executing instructions associated with a continuous integration and continuous delivery/deployment (CI/CD) pipeline manager, for each node of the plurality of nodes, an aggregate performance statistic reflecting the runtime values of the plurality of nodes, wherein the aggregate performance statistic represents a ratio of a difference between a runtime value of a node of the plurality of nodes and an average runtime value of the plurality of nodes excluding the node of the plurality of nodes and the average runtime value of the plurality of nodes excluding the node of the plurality of nodes; identifying, by the processing device executing instructions associated with a continuous integration and continuous delivery/deployment (CI/CD) pipeline manager, among the plurality of nodes, a node having the aggregate performance statistic that satisfies a performance threshold criterion; and marking, by the processing device executing instructions associated with a continuous integration and continuous delivery/deployment (CI/CD) pipeline manager, the node as underperforming.

10. The system of claim 9, wherein the runtime value represents an elapsed time of executing the CI/CD pipeline by the node.

11. The system of claim 9, wherein identifying the node of the plurality of nodes that satisfies the performance threshold criterion includes determining whether the aggregate performance statistic of the node of the plurality of nodes exceeds the performance threshold.

12. The system of claim 11, wherein the performance threshold refers to a predetermined aggregate performance statistic value at which a node of the plurality of nodes is considered underperforming with respect to other nodes of the plurality of nodes.

13. The system of claim 9, wherein the node comprises at least one of: a container, a virtual machine, or a bare-metal host.

14. The system of claim 9, wherein the operations further comprise:
analyzing the node to determine a cause of the underperformance.

15. The system of claim 9, wherein the operations further comprise:
for each node of a plurality of nodes, determine a failure count associated with the execution of the CI/CD pipeline, wherein the failure count represent a number of times the execution of the CI/CD pipeline failed;
identifying, in view of the failure count, at least one node of the plurality of nodes that satisfies a failure threshold criterion; and
responsive to identifying the at least one node of the plurality of nodes that satisfied the failure threshold criterion, marking the at least one node of the plurality of nodes as experiencing a high rate of failure.

16. The system of claim 15, wherein identifying the at least one node of the plurality of nodes that satisfies the failure threshold criterion includes determining whether the failure count of the at least one node of the plurality of nodes exceeds the failure threshold, and wherein the failure threshold is in view of an average of the failure count of the plurality of nodes excluding the at least one node of the plurality of nodes.

17. A non-transitory computer-readable storage medium comprising instructions that, when executed by a processing device executing instructions associated with a continuous integration and continuous delivery/deployment (CI/CD) pipeline manager, cause the processing device to perform operations comprising:
   for each node of a plurality of nodes, determining a failure count associated with an execution of a CI/CD pipeline;
   identifying, among the plurality of nodes, a node in which the corresponding failure count exceeds an aggregate failure statistic reflecting the failure counts of the plurality of nodes, wherein the aggregate failure statistic represents a ratio of a difference between a runtime value of a node of the plurality of nodes and an average runtime value of the plurality of nodes excluding the node of the plurality of nodes and the average runtime value of the plurality of nodes excluding the node of the plurality of nodes; and
   responsive to identifying the node of the plurality of nodes in which the corresponding failure count exceeds the aggregate failure statistic, marking the node as experiencing a high rate of failure.

18. The non-transitory computer-readable storage medium of claim 17, further comprising:
   analyzing the node of the plurality of nodes marked as experiencing a high rate of failure to determine a cause of the high rate of failure.

* * * * *